March 10, 1925.
M. L. DOUGLAS
COTTER PIN
Filed March 6, 1924
1,529,580
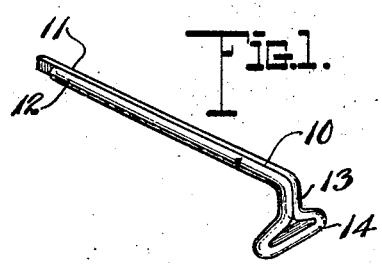
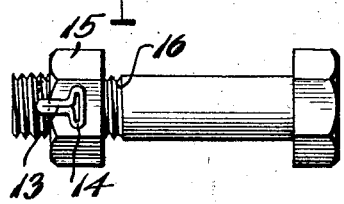
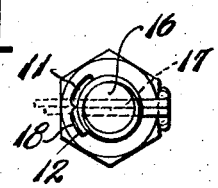
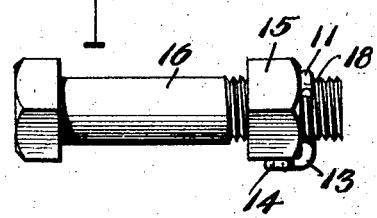
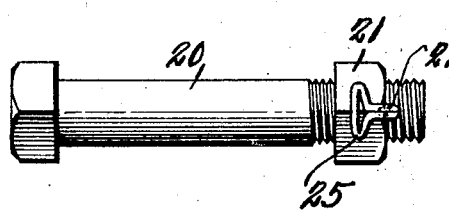
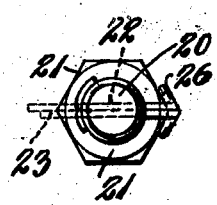
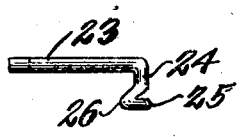
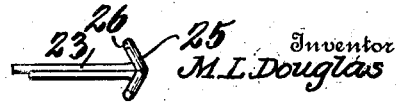
Inventor
M. L. Douglas Patented Mar. 10, 1925.

1,529,580

UNITED STATES PATENT OFFICE.

MATTHEW L. DOUGLAS, OF RYE, NEW YORK.

COTTER PIN.

Application filed March 6, 1924. Serial No. 697,322.

*To all whom it may concern:*

Be it known that I, MATTHEW L. DOUGLAS, a citizen of the United States, residing at Rye, in the county of Westchester and State of New York, have invented certain new and useful Improvements in Cotter Pins, of which the following is a specification.

This invention relates to a cotter pin, and particularly to a construction wherein the pin not only retains a nut against removal from its cooperating bolt but also holds the nut at its threaded adjustment. In the ordinary use of cotter pins for retaining nuts the bolt aperture is frequently so positioned that when the nut is tightened it is out of contact with the inserted cotter pin and is thus free for unthreading action which is liable to cause a shearing of the pin and in any event defeats a proper locking of the nut upon its bolt. To avoid these objections it is found desirable to provide a cotter pin with a laterally disposed head of sufficient length to engage the nut when in tightened position upon the bolt even though the nut be removed from the bolt aperture in which the cotter pin is secured.

The invention has for an object to provide a novel and improved construction comprising a cotter pin formed of a continuous piece of material bent upon itself with its bent end disposed at an angle to the body to engage the side wall of a nut to be held thereby.

A further object of the invention is to provide an improved constructon of cotter pin in which the bent end is laterally elongated and disposed at an acute angle to embrace a corner of a hexagonal nut to lock the same against movement upon its cooperating threaded bolt.

Other objects and advantages of the invention will be hereinafter set forth and the novel features thereof defined by the appended claim.

In the drawing:

Figure 1 is a perspective of the invention;

Figure 2 is an elevation showing the cotter pin applied;

Figure 3 is an end view thereof;

Figure 4 is an elevation at a right angle to Figure 2;

Figure 5 is an elevation showing a modified form of the cotter pin;

Figure 6 is an end view thereof;

Figure 7 is a detail elevation of the modified form of pin; and

Figure 8 is a plan thereof.

Like numerals refer to like parts throughout the several figures of the drawing.

The cotter pin may be formed of any desired material such as ordinarily used for such purposes, and in the form shown in Figure 1 the pin is formed of a continuous piece or strand of material 10 bent upon itself to form the body portion of the pin having the usual legs 11 and 12, one being of shorter length than the other. At the bent end of this body the head 13 is disposed at substantially a right angle thereto and is elongated laterally as at 14 to provide a broad bearing surface upon the face of the nut 15 threaded upon the bolt 16 as shown in Figure 2.

The body of the cotter pin is inserted through the usual aperture 17 provided in the bolt 16 and the free ends of the pin bent laterally to clinch the same in position as indicated at 18. When the pin is thus inserted the head portion extends longitudinally of the bolt for a sufficient distance to engage the side wall of the adjusted nut even if the body of the nut be removed from the aperture through the bolt owing to its tightening action so that the headed pin performs the function of a lock nut as well as positively preventing the complete withdrawal of the nut from the bolt even if the head of the pin is removed from the side wall of the nut. This headed portion of the pin also provides a surface by which it may be inserted by pressure thereon and held while the legs of the pin are bent against the bolt so as to tightly secure the pin in its adjusted position which effectually prevents any movement thereof relative to the nut.

Under some conditions of use it is desirable to engage the corner of a nut in order to enlarge the field of holding adjustment, as in the case of a hexagon nut, and for this purpose a modified form of the invention is shown in Figures 5 to 8 wherein the bolt 20 is provided with a hexagon nut 21 and an aperture 22 therethrough to receive the body 23 of the cotter pin which is formed with the head portion 24 bent at a right angle thereto as described in connection with Figure 1. The elongated portion 25 of this head is disposed at an acute angle, as indicated at 26, to embrace a corner of the adjusted nut and the angle of this deflection of the head may be varied to correspond to any particular character of nut.

It will be seen that the invention provides a very simple form of cotter pin adapted to be formed by a single and economical manufacturing operation and to cooperate with the ordinary construction of nut which avoids the necessity of using castellated nuts and the expense incident thereto. The invention provides a very efficient means for positively securing the nut in adjusted position and one capable of a variety of applications in its cooperative relation between the bolt and the side wall of a nut to be locked in position thereon.

Having thus described my invention, what I claim as new and desire to secure by Letters Patent is:

A cotter pin formed of a continuous piece of material bent upon itself with a portion of its shank disposed at substantially a right angle to the body and having oppositely extending portions forming substantially parallel members transversely of the shank and connected by the continuously bent end thereof to provide an elongated head for engagement with the side wall of a nut.

In testimony whereof I affix my signature.

MATTHEW L. DOUGLAS.